United States Patent [19]

Gierer

[11] Patent Number: 5,103,930
[45] Date of Patent: Apr. 14, 1992

[54] APPARATUS FOR ELECTROHYDRAULIC ACTUATION OF A CLUTCH ASSEMBLY FOR LOCKING THE DIFFERENTIAL TRANSMISSION OF A MOTOR VEHICLE

[75] Inventor: Georg Gierer, Kressbronn, Fed. Rep. of Germany

[73] Assignee: Zahnradfabrik Friedrichshafen AG, Fed. Rep. of Germany

[21] Appl. No.: 499,378

[22] PCT Filed: Nov. 24, 1988

[86] PCT No.: PCTEP/88/01065
§ 371 Date: May 24, 1990
§ 102(e) Date: May 24, 1990

[87] PCT Pub. No.: WO89/05247
PCT Pub. Date: Jun. 15, 1989

[30] Foreign Application Priority Data
Dec. 1, 1987 [DE] Fed. Rep. of Germany ....... 3740662

[51] Int. Cl.$^5$ .............................................. B60K 23/04
[52] U.S. Cl. ..................................................... 180/249
[58] Field of Search ................ 180/247, 248, 249, 233

[56] References Cited

U.S. PATENT DOCUMENTS 4,787,471 11/1988 Kobayashi .......................... 180/249
4,874,059 10/1989 Kasegawa .......................... 180/249

FOREIGN PATENT DOCUMENTS 0246884 11/1987 European Pat. Off. .
3212495 8/1985 Fed. Rep. of Germany .
3600873 6/1987 Fed. Rep. of Germany .

Primary Examiner—Mitchell J. Hill
Attorney, Agent, or Firm—Davis, Bujold & Streck

[57] ABSTRACT

A device for electrohydraulic actuation of a clutch of a differential transmission (31) situated between an automatic transmission (3) and the drive wheels of the vehicle comprises an actuating piston (23) actuated by pressurized fluid supplied via a main contorl line (4) through a safety valve (6) and a clutch valve (13), a pressure reducing valve (5) is provided for supplying a reduced constant pressure fluid to a pilot control line (7) which is connected to both the safety valve (6) and the clutch valve (13), and a pressure control valve (11) is provided in the pilot contorl line (7) and, when the pressure control valve (11) is closed, the clutch and safety valves (6, 13) are both closed by the reduced pressure fluid thereby preventing the flow of pressurized fluid to the actuation piston, and when pressure control valve (11) is open, the flow of pressurized fluid to the actuation piston (23) is allowed by the safety and clutch valves (6, 13) thereby allowing engagement of the clutch and the locking of the differential transmission.

7 Claims, 1 Drawing Sheet

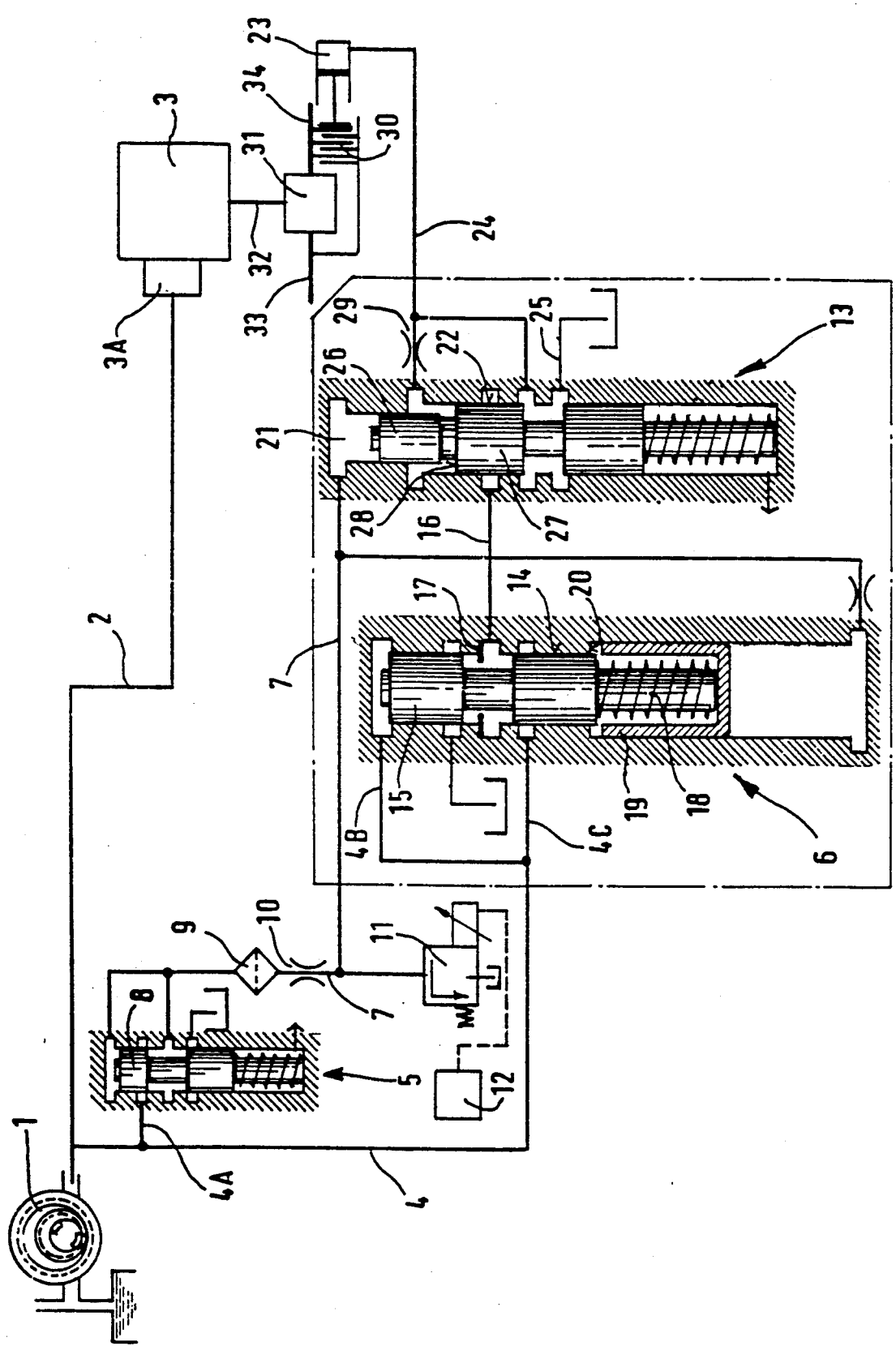

APPARATUS FOR ELECTROHYDRAULIC ACTUATION OF A CLUTCH ASSEMBLY FOR LOCKING THE DIFFERENTIAL TRANSMISSION OF A MOTOR VEHICLE

FIELD OF THE INVENTION

The invention concerns an apparatus for electrohydraulic actuation of a clutch that locks a transfer differential transmission of a motor vehicle having an actuation piston actuatable with pressurized fluid via a main control line depending on the position of an electrically actuatable pressure-control valve wherein the pressure-control valve, when actuated, pressurelessly diverts pressurized fluid to the tank and wherein the transfer differential transmission is situated at the rear of an automatic transmission.

BACKGROUND OF THE INVENTION

In an already known apparatus of this kind (DE-A 32 12 195), a transfer differential transmission situated on the transmission output and connected with both axles of the motor vehicle is locked by means of a multi-disc clutch in accordance with the parameters of the motor vehicle such as travel speed, steering angle, or engine torque. For said purpose, the multi-disc clutch is engaged by a hydraulic working pressure of a main control line against a disengaging spring, the working pressure in the main control line being adjusted as result of said parameters, by means of an electro-magnetically actuated pressure-control valve, and therewith the locking effect of the multi-disc clutch. A separate hydraulic system is provided for said actuation of the multi-disc clutch. Besides, upon actuation of the pressure-control valve in direction of the opening, vibrations can appear in the main control line pressure which lead to an indifferent control behavior of the whole pressure system.

SUMMARY OF THE INVENTION

Accordingly, the problem to be solved by this invention is, in order to reduce the construction cost, to combine an apparatus for electro-hydraulic actuation of a clutch of a transfer differential transmission with a hydraulic system already existing in the motor vehicle whereby pressure fluctuations, which are produced by parallel control operations of the control system and can result in pressure drops of the system and natural vibrations of the pressure-control valve, should have no effect upon the actuation of the apparatus of the general type.

Said problem is solved in an apparatus of the above mentioned kind by the fact that the main control line is connected to a main pressure system of a control unit of the automatic transmission, that starting from the main pressure system a reduced constant pressure is obtained by a pressure-reducing valve in a pilot control line in which the pressure-control valve is situated and which via a control space acts upon a control piston of a clutch valve situated in the main control line whose spout, spring-loaded on the other side, activates the actuation piston with pressurized fluid from the main control line, and that damping means, preferably a spring-accumulator damper, is situated in the pilot control line for reducing pressure vibrations Accordingly, pressurized fluid is fed to the actuation piston from the main pressure system of the automatic transmission via the main control line in accordance with the position of the clutch valve or the actuation piston is pressure-relieved The clutch valve is actuated here via the pilot control line where a reduced, constant pressure is obtained by the pressure-reducing valve. Consequently, the pressure-reducing valve already eliminates pressure fluctuations which can occur in the main pressure system of the automatic transmission and thus faulty controls of the clutch can be prevented. Since the pressure-control valve in which a pilot control line having reduced working pressure is situated and which acts only upon the spool of the clutch valve which, on the other hand, is spring-loaded, the danger of producing vibrations can be reduced considerably But for reasons of safety, a damping means in the form of a spring-accumulator damper is also situated in the pilot control line which reduces the natural vibrations of the pressure control valve. damping piston of the spring-accumulator damper can interact with safety valve front-mounted on a clutch valve and which, when the pressure control valve is open and via controlled annular spaces, actuates a connecting line leading toward the clutch valve with pressurized fluid from the main control line, and that a spool of the safety valve is actuated no a end face with the pressure from the main control line and on the opposite end face with tension from a spring of the damping piston. Thereby a safety pressure is adjusted via the spring preloaded by the damping piston when the pressure-control valve is not actuated, being therefore idle, as result of the spring pre-loading, that is, said safety valve front-mounted on the clutch valve feeds system pressure to the clutch valve only when the system pressure is above the safety pressure adjusted by the spring When the pressure-control valve is idle, a pressure prevails in the pilot control line which moves the damping piston to an end position in which it abuts against a stop of the housing. When the pressure in the pilot control line is reduced by the pressure-control valve, the damping piston moves from the stop and the safety valve can be shifted from the pressure of the main control line acting upon its end face to an extent such that a supply of pressurized fluid to the actuation piston of the clutch results via the clutch valve likewise releasing an opening cross section. In this position of the damping piston, it can again fulfill the function of a spring-accumulator damper and compensate pressure vibrations in the system. If in this state of the system a pressure drop occurs in the main control line, the safety valve does not open to reverse since the spring tension on the safety valve is likewise reduced. The same conditions also apply to pressure drops in the main control line before or during the closing of the clutch, since then the spring preloading on the safety valve is also reduced due to the changed position of the damping piston to an extent such that the safety valve can assume its working position. It has been further proposed that the surfaces on the end face of the spool and of the damping piston be dimensioned differently so that despite different pressure levels, the axial forces occurring on the spool and on the damping piston when the pressure control valve is closed can be compensated.

In addition, a throttle is to be situated between the pressure-reducing valve and the pressure-control valve in the pilot control line which, when the pressure-control valve is open, limits the flow of pressurized fluid fed from the main pressure system of the automatic transmission in order that pressure drops be prevented in the main pressure system. In another embodiment of the invention, it is proposed that the clutch valve has a spool which is actuated on an annular surface of the control piston against the tension of the spring with the pressurized fluid outcropping on the actuation piston of the clutch. Therefore, when the clutch is engaged, the pressure from the pilot control line and the actuation pressure of the clutch act upon the spool of the clutch valve in one direction.

The invention is not limited to the combination of features of the claims. Other possible logical combinations result for the expert from the claims and individual features of the claims as the problem arises.

BRIEF DESCRIPTION OF THE DRAWING

For further explanation of the invention, reference is had to the drawing where an embodiment of the invention is illustrated in simplified manner. The only Figure diagrammatically shows an apparatus according to the invention for the electro-hydraulic actuation of a clutch for locking a transfer differential transmission.

DESCRIPTION OF THE PREFERRED EMBODIMENT

In the drawing, a hydraulic pump is designated with a 1 which conveys pressurized fluid into a main pressure system 2 of a control unit 3A of an automatic transmission 3 for a motor vehicle that is not illustrated in detail. The design of a corresponding control unit 3A can be deduced from WO-A86/06809, for example. A main control line 4 which leads to a pressure-reducing valve 5 via a line section 4A branches off from the main pressure system 2 for the control unit 3A. Besides, the main control line 4 is connected via line sections 4B and 4C to a safety valve 6. A pilot control line 7 communicates with the pressure-reducing valve 5. The pressure-reducing valve 5 creates a reduced constant pressure in said pilot control line 7 compared to the system pressure prevailing in the main pressure system 2 and in the main control line 4. The pressure-reducing valve 5 has a spring-loaded spool 8 which, when it falls below a boundary pressure in the pilot control line 7, connects the latter with the line section 4A of the main control line 4. A filter 9 and a throttle 10 are also situated in the pilot control line 7. In addition to the throttle 10, the pilot control line 7 is connected with an electrically actuated pressure-control valve 11 which functionally serves as a shut-off valve and, when actuated, effects a reduction of pressure in the pilot control line 7. The pressure-control valve 11 is connected with an actuation device 12. Finally, a safety valve 6 and a clutch valve 13 are attached to the pilot control line 7.

The safety valve 6 has a spool 14 which is actuated by pressurized fluid on the end face of its control piston 15 via the line section 4B of the main control line 4. Line section 4C discharges in the interior of the safety valve 6 as a controllable connection, the spool 14 connecting in its two shift positions the line section 4C with a connecting line 16 or discharging said connecting line 16 toward the tank. The pressure in the line section 4B produces a downward movement of the spool 14 which is limited by a stop 17. The spool 14 has a spring 18 at the end opposite the control piston 15. Said spring 18 is designed jointly with a damping piston 19 as spring-accumulator damper, the damping piston 19 being axially movable against a stop 20, a pressurized fluid actuation takes place at the end face on the damping piston 19 by the pilot control 7. In parallel therewith, the pilot control line 7 is connected to a control space 21 of the clutch valve 13. The clutch valve 13 additionally has a spool 22 which, on one side, is actuated with pressurized fluid by the pilot control line via the control space 21 and, on the opposite end, is spring loaded. Depending on the position of the spool 22, a clutch line 24 leading to an actuation piston 23 is attached to the connecting line or to a return line 25. A control piston 26 is immersed in the control space which is designed with smaller diameter in comparison to an adjacent control piston 27 so that in this position the spool 22 has an annular surface 28 pointing in an axial direction. Starting from the clutch line 24, a line section having a throttle 29 is connected to the clutch valve 13 in a manner such that the pressurized fluid acts upon the annular surface 28.

The actuation piston 23, actuatable with pressurized fluid via the clutch line 24, acts upon a clutch 30 which serves to lock a transfer differential transmission 31 shown diagrammatically. Said transfer differential transmission 31 is connected to an output shaft 32 of the automatic transmission and has output shafts 33 and 34 which serve to drive wheel axles of the motor vehicle that are not shown in detail. In a disengaged position of the clutch 30, the transfer differential transmission 31 allows different speeds of the output shafts 33 and 34 whereas in an engaged position of the clutch 30, the output shafts 33 and 34 are non-rotatably interconnected.

The operation of the illustrated apparatus is as follows: Starting from the hydraulic pump 1, the control unit 3A of the automatic transmission 3 is supplied via the main pressure system 2 with pressurized fluid which, via the main control 4, also serves to control the clutch 30 of the transfer differential transmission 31. The system pressure of the main pressure system 2 prevails in the main control line 4 while a lower pressure for the pilot control line 7 is obtained over the pressure-reducing valve 5. In the illustrated position of the spool 14 of the safety valve 6 and of the spool 22 of the clutch valve 13, a maximum pressure prevails in the pilot control line 7. In this position in which the damping piston 19 abuts against the stop 20, the safety valve 6 prevents a change in the system pressure and the position of the clutch is released in this case. If the pressure-control valve 11 is now opened toward the tank connection, via the actuation device 12, the pressure drops in the pilot control line 7 and the damping piston 19 moves to a lower position in which the prestress of the spring 18 is reduced so that the spool 14, as result of the system pressure outcropping on the opposite end face, is likewise moved to the position in which it connects the section 4C of the main control line 4 with the connecting line 16. The pressure in the control space 21 of the clutch valve 13 simultaneously drops and the spool 22 is moved by spring tension to a position in which it connects the connecting line 16 with the clutch line 24 so that the actuation piston 23 engages the clutch and consequently locks the transfer differential transmission 31.

The pressure vibrations occurring when the pressure control valve 11 is open in the pilot control line 7, due to the natural frequency of the pressure control valve 11, are compensated by the cushioned damping piston 19. When a pressure drop occurs in the main pressure system 2 of the automatic transmission 3 and thus also in the main control line 4, the latter does not act when the clutch 30 is engaged, for the counteracting force of the spring 18 on the spool 14 of the safety valve 6 is so weak that the safety valve 6 does not open. The same also applies when the system pressure is extensively lowered before a shift of the actuation device 12. When the pressure-control valve 11 is opened, the counteracting force of the spring on the spool 14 diminishes to an extent such that, even when the system pressure is reduced, the safety valve is moved to a position in which it connects the main control line 4 with the connecting line 16, Reference numerals 1 hydraulic pump
2 main pressure system
3 automatic transmission
3A control unit
4 main control line
4A line section of 4
4B line section of 4
4C line section of 4
5 pressure-reducing valve
6 safety valve
7 pilot control line
8 spool of 5
9 filter
10 throttle
11 pressure-control valve
12 actuation device
13 clutch valve
14 spool of 6
15 control piston of 14
16 connecting line
17 stop for 15
18 spring
19 damping piston
20 stop for 19
21 control space of 13
22 spool of 13
23 actuation piston
24 clutch line
25 return line
26 control piston
27 control piston
28 annular surface
29 throttle
30 clutch
31 transfer differential transmission
32 output shaft
33 output shaft
34 output shaft

I claim:

1. An apparatus for electro-hydraulic actuation of a locking clutch for a differential transmission of a motor vehicle located in a drive path between an automatic transmission and output shafts of the vehicle, said apparatus comprising:
   an actuation piston for engaging the clutch,
   a main control line for supplying pressurized fluid to said actuation piston, and
   an electrically actuatable pressure control valve for controlling flow of pressurized fluid through said main control line to said actuation piston for engaging said clutch and locking the differential transmission,
   wherein said main control line is connected to and supplied with pressurized fluid from a main system pressure of the automatic transmission, and a clutch valve, having means for biasing said clutch valve into an open position, has an inlet connected to said main control line and an outlet connected to said actuation piston;
   an inlet of a pressure reducing valve is connected to said main control line and an outlet of said pressure reducing valve is connected to and supplies reduced pressurized fluid to a pilot control line connected to an inlet of said pressure-control valve, an inlet of a damping device for reducing pressure vibration in said pilot control line, and a cavity of said clutch valve for biasing said clutch valve into a closed position; and
   said pressure-control valve, when in an opened position, diverting the reduced pressurized fluid through an outlet thereof to a reservoir thereby lowering the pressure in said pilot control line,
   whereby when said pilot control valve is in a closed position, the reduced pressurized fluid is supplied to, via said pilot control line, said cavity and closes said clutch valve preventing the flow of pressurized fluid to said actuation valve, and when said pressure control valve is in its open position, the reduced pressurized fluid is diverted by said pressure control valve to the reservoir thereby allowing said biasing means to bias said clutch valve into an opened position and allowing pressurized fluid to flow from said main control line, via said clutch valve, to said actuation piston to engage said clutch and lock the differential transmission of the vehicle.

2. An apparatus according to claim 1, wherein said damping device is a spring-accumulator damper.

3. An apparatus according to claim 2, wherein a safety valve has an inlet connected to said main control line and an outlet connected, via a connecting line, to the inlet of said clutch valve, said safety valve contains a spool with a first end face thereof which communicates with the pressurized fluid supplied by said main control line and biases said clutch valve into an open position and a second, opposite end face thereof which interacts with said spring-accumulator damper comprising a spring arrangement connected to a damping piston, said pilot control line supplies reduced pressurized fluid to an end face of said damping piston and biases said safety valve into a closed position, whereby when said pressure control valve is opened, the pressurized fluid supplied to said first end face opens said safety valve and the pressurized fluid flows via said main control line through said safety valve to said clutch valve, and when said pressurized control valve is closed the reduced pressurized fluid opposes opening of said safety valve and prevents pressurized fluid flow to said clutch valve.

4. An apparatus according to claim 3, wherein said safety valve includes a housing and said damping piston is movable to an end position, by the reduced pressure fluid supplied by said pilot control line, in which the damping piston abuts against a stop of the housing.

5. An apparatus according to claim 3, wherein the first end face of said control piston and an end face of said damping piston, engaging the reduced pressure fluid, are dimensioned, taking into account the difference in fluid pressure prevailing in said main control line and said pilot control line, so that equal and opposite axial forces are applied to said spool, when said pressure control valve is closed, to prevent pressurized fluid flow through said safety valve.

6. An apparatus according to claim 1, wherein a throttling device is positioned in said pilot control line between said pressure reducing valve and said pressure control valve.

7. An apparatus according to claim 1, wherein said clutch valve comprises a spool containing a control piston having an annular surface which is actuated with the pressurized fluid supplied to said actuation piston in an opening direction opposing the biasing means of said clutch valve.

* * * * *